US008605014B2

(12) United States Patent
Takasugi

(10) Patent No.: US 8,605,014 B2
(45) Date of Patent: Dec. 10, 2013

(54) METHOD OF DRIVING IMAGE DISPLAY APPARATUS

(75) Inventor: Shinji Takasugi, Kanagawa (JP)

(73) Assignee: LG Display Co., Ltd., Seoul (KR)

( * ) Notice: Subject to any disclaimer, the term of this patent is extended or adjusted under 35 U.S.C. 154(b) by 926 days.

(21) Appl. No.: 12/306,877

(22) PCT Filed: Jun. 29, 2007

(86) PCT No.: PCT/JP2007/063167
§ 371 (c)(1), (2), (4) Date: Dec. 29, 2008

(87) PCT Pub. No.: WO2008/001911
PCT Pub. Date: Jan. 3, 2008

(65) Prior Publication Data

US 2009/0322726 A1 Dec. 31, 2009

(30) Foreign Application Priority Data

Jun. 29, 2006 (JP) ................................ 2006-179696

(51) Int. Cl.
*G06F 3/038* (2013.01)

(52) U.S. Cl.
USPC ............... 345/76; 345/211; 345/82; 345/204; 345/214; 315/169.3

(58) Field of Classification Search
USPC ............ 345/204, 211, 214, 76, 82; 315/169.3
See application file for complete search history.

(56) References Cited

U.S. PATENT DOCUMENTS

| | | | |
|---|---|---|---|
| 7,193,589 B2 | 3/2007 | Yoshida et al. | |
| 2002/0047839 A1 | 4/2002 | Kasai | |
| 2003/0160745 A1* | 8/2003 | Osame et al. | 345/82 |
| 2004/0032380 A1 | 2/2004 | Kanauchi | |
| 2004/0041525 A1 | 3/2004 | Park et al. | |
| 2004/0090186 A1* | 5/2004 | Yoshida et al. | 315/169.1 |
| 2004/0174354 A1 | 9/2004 | Ono et al. | |

(Continued)

FOREIGN PATENT DOCUMENTS

| | | |
|---|---|---|
| JP | 2002-169510 A | 6/2002 |
| JP | 2004-70057 A | 3/2004 |

(Continued)

OTHER PUBLICATIONS

R. M. A. Dawson et al., SID 98 Digest, 1998, pp. 11-14.

(Continued)

*Primary Examiner* — Lun-Yi Lao
*Assistant Examiner* — Sosina Abebe
(74) *Attorney, Agent, or Firm* — Birch, Stewart, Kolasch & Birch, LLP

(57) ABSTRACT

A method of driving an image display apparatus that includes a plurality of pixel circuits each provided with an organic light emitting device and a driving transistor that is electrically connected to the organic light emitting device and controls light emission of the organic light emitting device, includes: feeding the pixel circuits with an image signal corresponding to light emission luminance of the organic light emitting device; applying a reverse bias voltage to the organic light emitting device; and causing the organic light emitting device to emit light based on the image signal.

3 Claims, 11 Drawing Sheets

(56) References Cited

U.S. PATENT DOCUMENTS

| | | | | |
|---|---|---|---|---|
| 2004/0252089 | A1 | 12/2004 | Ono et al. | |
| 2005/0030265 | A1 * | 2/2005 | Miyagawa | 345/76 |
| 2005/0083270 | A1 | 4/2005 | Miyazawa | |
| 2005/0162354 | A1 * | 7/2005 | Osame et al. | 345/76 |
| 2006/0066644 | A1 * | 3/2006 | Yamaguchi et al. | 345/690 |
| 2006/0125737 | A1 * | 6/2006 | Kwak et al. | 345/76 |
| 2006/0208977 | A1 * | 9/2006 | Kimura | 345/76 |
| 2006/0267886 | A1 * | 11/2006 | Ozaki et al. | 345/76 |
| 2007/0285359 | A1 | 12/2007 | Ono | |

FOREIGN PATENT DOCUMENTS

| | | | |
|---|---|---|---|
| JP | 2004-157467 | A | 6/2004 |
| JP | 2004-280059 | A | 10/2004 |
| JP | 2004-341359 | A | 12/2004 |
| JP | 2005-099715 | A | 4/2005 |
| JP | 2007-310034 | A | 11/2007 |
| KR | 10-2004-0019207 | A | 3/2004 |

OTHER PUBLICATIONS

S. Ono et al., Proceedings of IDW, 2003, pp. 255-258.

* cited by examiner

METHOD OF DRIVING IMAGE DISPLAY APPARATUS

TECHNICAL FIELD

The present invention relates to a method of driving an image display apparatus.

BACKGROUND ART

Image display apparatuses have been proposed that use a current-control type organic EL (Electroluminescent) device having a function of emitting light through the recombination of electrons and positive holes injected into the light emitting layer.

In an image display apparatus of this type, each pixel includes a thin film transistor (TFT) which is formed of, for example, amorphous silicon or polycrystalline silicon, and an organic light emitting diode (OLED), which is one of the organic EL devices. The brightness of the pixel is controlled by setting its current to an appropriate value.

For example, an active matrix image display apparatus with a plurality of pixels, each having a light emitting device connected in series with a driving transistor such as TFT, suffers from brightness fluctuations due to changes in current flowing through the light emitting device. Several technologies have been disclosed to counteract this phenomenon. One such technology involves detecting in advance the threshold voltage of the driving transistor so that the current flowing through the light emitting device can be controlled based on the threshold voltage (see, for example, Non-Patent Document 1). On the basis of the technology, specific circuitry has also been disclosed (see, for example, Non-Patent Document 2).

[Non-Patent Document 1] R. M. A. Dawson et al., "Design of an Improved Pixel for a Polysilicon Active-Matrix Organic LED Display," in SID Tech. Dig., 1998, pp. 11-14.

[Non-Patent Document 2] Ono et al., "Pixel Circuit for a-Si AM-OLED," IDW'03 (2003), pp. 255-258.

DISCLOSURE OF INVENTION

Problem to be Solved by the Invention

However, with the technologies as disclosed in the above non-patent documents, a black level image is displayed. Therefore, even if off current near the threshold voltage of the driving transistor is sufficiently reduced, current flows through the light emitting device until the capacitance of the light emitting device and the parasitic capacitance of the pixel circuit are charged. As a result, the light emitting device emits light at the initial stage of the light emission period. Accordingly, the ratio of the luminance of white to that of black or white level to black level, i.e., contrast ratio, is degraded.

It is therefore an object of the present invention to provide a method of driving an image display apparatus capable of improving the contrast ratio in a simple manner.

Means for Solving Problem

According to an aspect of the present invention, a method of driving an image display apparatus that includes a plurality of pixel circuits each provided with a light emitting unit and a driving unit that is electrically connected to the light emitting unit and controls light emission of the light emitting unit, includes: feeding the pixel circuits with an image signal corresponding to light emission luminance of the light emitting unit; applying a reverse bias voltage to the light emitting unit; and causing the light emitting unit to emit light based on the image signal.

The method may further include changing potential of a power source line that is electrically connected to the light emitting unit and the driving unit to apply the reverse bias voltage to the light emitting unit.

In the method, the light emitting unit and the driving unit may be electrically connected in series with each other upon applying the reverse bias voltage to the light emitting unit and causing the light emitting unit to emit light.

In the method, the light emitting unit may include an organic light emitting device, the driving unit may include a thin film transistor, and capacitance of the organic light emitting device may be larger than parasitic capacitance between a source and a drain of the thin film transistor.

Effect of the Invention

FIG. 9 is a sequence diagram showing the operation of the pixel circuit shown in FIG. 2 to which is applied a control method according to an exemplary embodiment of the present invention. The sequence shown in FIG. 9 differs from that of FIG. 3 in that the potential of the power source line 10 is raised from zero to Vp in the charge period provided between the write period and the light emission period. As the potential of the power source line 10 increases, the source potential of the driving transistor Td also increases. Consequently, the device capacitance Coled can be charged to a predetermined level as in the preparatory period. In the preparatory period, the device capacitance Coled is charged so that it acts as a source of current upon detection of the threshold voltage. On the other hand, in the charge period, the device capacitance Coled is charged to reduce the current that instantaneously flows at the initial stage of the light emission period. Thereafter, the light emitting unit is caused to emit light. Thus, it is possible to prevent a large current from flowing through the light emitting unit at the initial stage of the light emission period. This reduces the amount of current flowing through the light emitting unit that is emitting light at a low gray level. As a result, the contrast ratio of the image display apparatus is improved.

EXPLANATIONS OF LETTERS OR NUMERALS

10 Power source line
11 Control line
12 Merge line
13 Scan line
14 Image signal line
OLED Organic light emitting device
Cs Capacitance
Td Driving transistor
Tm, Ts Switching transistor
Tth Threshold voltage detecting transistor
D1, D2, D3 Light emitting device
Q1, Q2, Q3 Driving device
U1, U2, U3 Controller

BEST MODE(S) FOR CARRYING OUT THE INVENTION

Exemplary embodiments of a method of driving an image display apparatus according to the present invention are described in detail with reference to the accompanying drawings. It is to be understood that the present invention is not limited to the embodiments described below.

Figure 1:
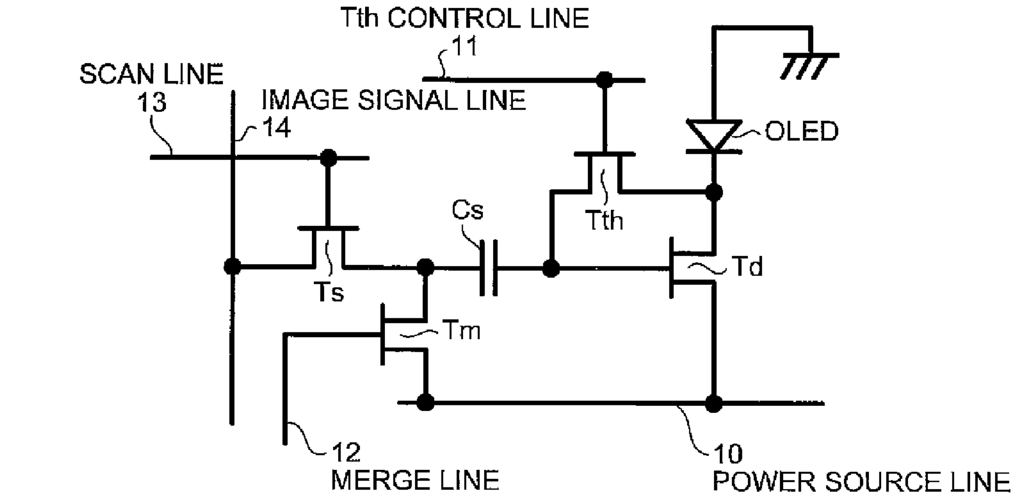
FIG. 1 is a diagram showing a configuration of a pixel circuit corresponding to one pixel of an image display apparatus for describing a first embodiment of the present invention.

FIG. 1 is a diagram showing a configuration of a pixel circuit corresponding to one pixel of an image display apparatus for describing a first embodiment of the present invention. Pixel circuits as shown in FIG. 1 are arranged in matrix. The pixel circuits each includes an organic light emitting device OLED, i.e., one of the organic EL devices, a driving transistor Td, a threshold voltage detecting transistor Tth, and switching transistors Ts and Tm. The switching transistor Ts and Tm connects a capacitance Cs to a predetermined line for a predetermined period of time. The capacitance Cs holds a threshold voltage and an image signal potential. FIG. 1 depicts only a general configuration of a pixel circuit that controls an organic light emitting device and the like, and exhibits no essential feature of the present invention.

In FIG. 1, the driving transistor Td is a device that controls the amount of current flowing through the organic light emitting device OLED based on a potential difference between the gate electrode and the source electrode thereof. When turned on, the threshold voltage detecting transistor Tth electrically connects the gate electrode and the drain electrode of the driving transistor Td, so that current flows from the gate electrode towards the drain electrode until a potential difference between the gate electrode and the source electrode of the driving transistor Td reaches a threshold voltage Vth of the driving transistor Td. Thus, the threshold voltage detecting transistor Tth detects the threshold voltage Vth of the driving transistor Td.

The organic light emitting device OLED is characterized in that it emits light when a potential difference (anode-cathode voltage) greater than a threshold voltage occurs between its both ends. Specifically, the organic light emitting device OLED includes an anode layer and a cathode layer with a light emitting layer therebetween. The anode layer is made of Al, Cu, ITO (Indium Tin Oxide), and the like. The light emitting layer is made of an organic material such as phthalocyanine, aluminum tris complex, benzoquinolinolate, and beryllium complex, and has a function of emitting light through the recombination of electrons and positive holes injected therein.

The driving transistor Td, the threshold voltage detecting transistor Tth, and the switching transistors Ts and Tm can be, for example, thin film transistors. In the drawings hereinafter referred to, each of the thin film transistors can be of N-channel type as well as of P-channel type.

The driving transistor Td and the switching transistor Tm are supplied with power through a power source line 10. The threshold voltage detecting transistor Tth is controlled by a signal provided through a Tth control line 11. The switching transistor Tm is controlled by a signal provided through a merge line 12, while the switching transistor Ts is controlled by a signal provided through a scan line 13. The light emission luminance of the organic light emitting device OLED corresponds to an image signal provided through an image signal line 14.

In the example of FIG. 1, the organic light emitting device OLED is located between a high-potential ground line and the low-potential power source line 10 to receive a predetermined power supply. However, the high-potential line can be the power source line 10, and the low-potential line can be a ground line maintained at a fixed potential. Besides, both the lines can be power source lines with a variable potential.

Figure 2:
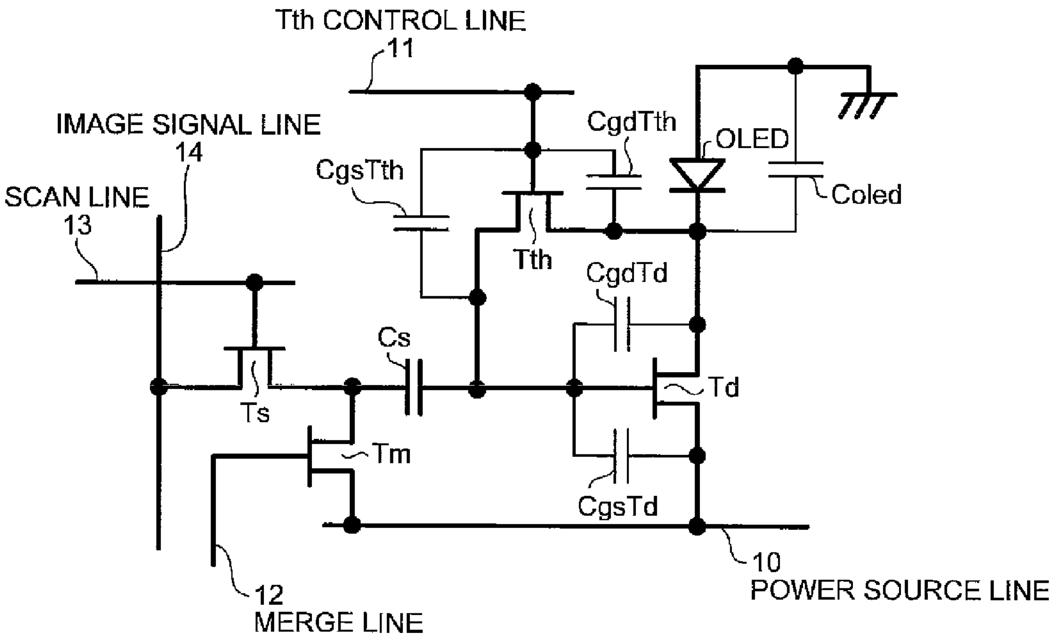
FIG. 2 is a diagram showing the parasitic capacitance of transistors and device capacitance on the pixel circuit shown in FIG. 1.

In general, the transistor has a parasitic capacitance between its gate and source and between its gate and drain. The gate potential of the driving transistor Td is affected by capacitance CgsTd between the gate and source of the driving transistor Td, capacitance CgdTd between the gate and drain of the driving transistor Td, capacitance CgsTth between the gate and source of the threshold voltage detecting transistor Tth, and capacitance CgdTth between the gate and drain of the threshold voltage detecting transistor Tth. FIG. 2 depicts these parasitic capacitances and specific capacitance Coled of the organic light emitting device OLED in the pixel circuit.

Figure 3:
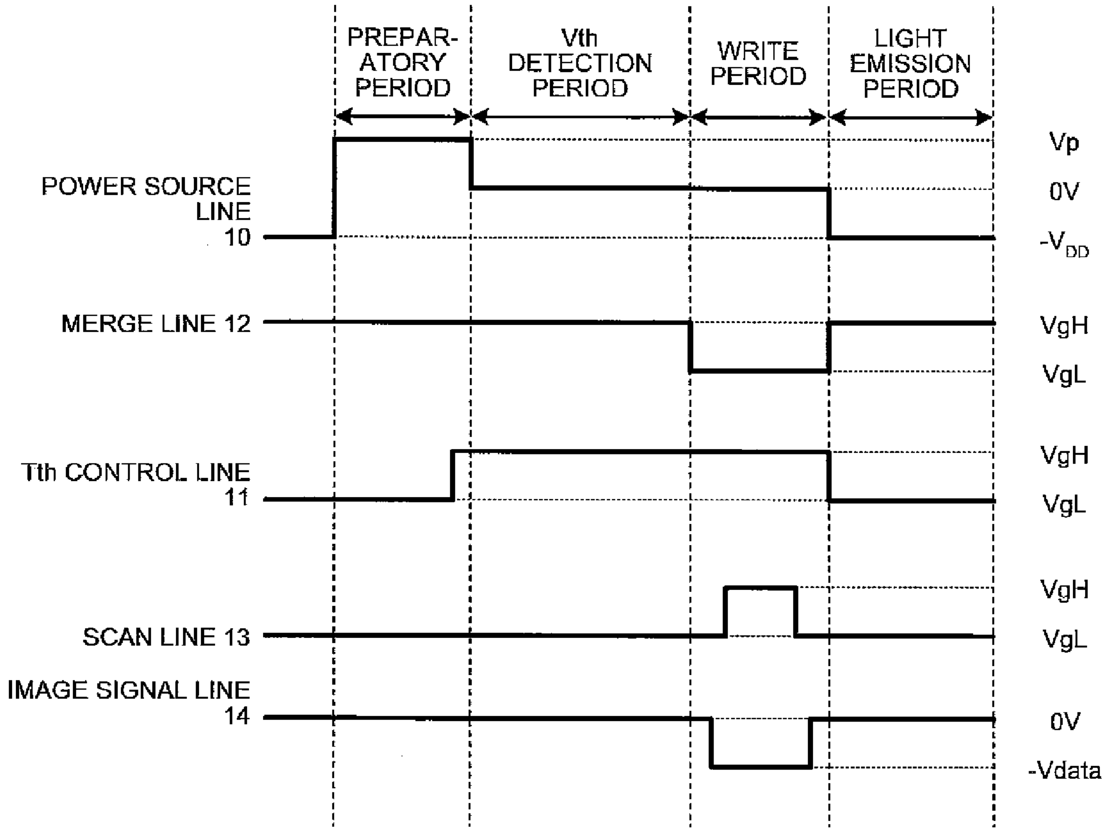
FIG. 3 is a sequence diagram showing the general operation of the pixel circuit shown in FIG. 2.

The operation of the embodiment is described below with reference to FIGS. 3 to 7. FIG. 3 is a sequence diagram showing the general operation of the pixel circuit shown in FIG. 2. FIGS. 4 to 7 are diagrams illustrating the operation during the sequence divided into four periods: preparatory period (FIG. 4), threshold voltage detection period (FIG. 5), write period (FIG. 6), and light emission period (FIG. 7). The operation is performed under the control of a control unit (not shown).

(Preparatory Period)

Figure 4:
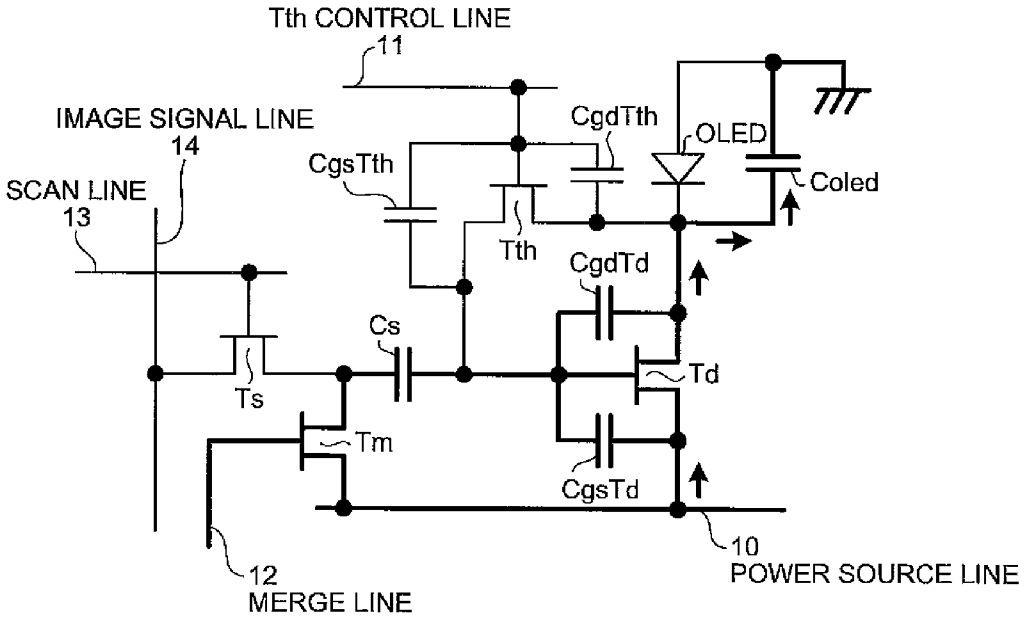
FIG. 4 is a diagram illustrating the operation during the preparatory period in the sequence shown in FIG. 3.

The operation during the preparatory period is described with reference to FIGS. 3 and 4. In the preparatory period, the power source line 10 is set to a high potential (Vp), the merge line 12 is set to a high potential (VgH), the Tth control line 11 is set to a low potential (VgL), the scan line 13 is set to a low potential (VgL), and the image signal line 14 is set to zero potential. With this, as shown in FIG. 4, the threshold voltage detecting transistor Tth is turned off, the switching transistor Ts is turned off, the driving transistor Td is turned on, and the switching transistor Tm is turned on. Thus, current flows along the path from the power source line 10 through the driving transistor Td to the device capacitance Coled, and the device capacitance Coled is charged. The device capacitance Coled is charged so that it acts as a source of current that flows between the drain and source of the driving transistor Td when the voltage between the gate and source of the driving transistor Td is brought close to the threshold voltage in the threshold voltage detection period described later.

(Threshold Voltage Detection Period)

Figure 5:
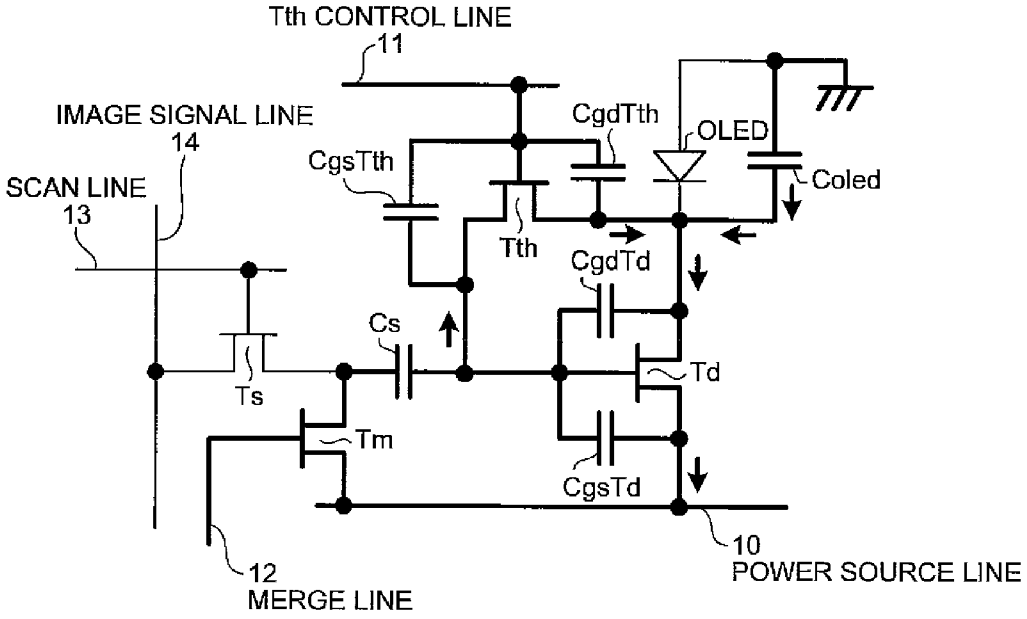
FIG. 5 is a diagram illustrating the operation during the threshold voltage detection period in the sequence shown in FIG. 3.

The operation during the threshold voltage detection period is described next with reference to FIGS. 3 and 5. In the threshold voltage detection period, the power source line 10 is set to zero potential, the merge line 12 is set to a high potential (VgH), the Tth control line 11 is set to a high potential (VgH), the scan line 13 is set to a low potential (VgL), and the image signal line 14 is set to zero potential. With this, as shown in FIG. 5, the threshold voltage detecting transistor Tth is turned on, and the gate and drain of the driving transistor Td are connected together.

In addition, the capacitance Cs and the device capacitance Coled previously charged are discharged. Thus, current flows along the path from the driving transistor Td to the power source line 10. When voltage Vgs between the gate and source of the driving transistor Td reaches the threshold voltage Vth, the driving transistor Td is turned off. As a result, the threshold voltage Vth of the driving transistor Td is detected.

(Write Period)

The operation during the write period is described next with reference to FIGS. 3 and 6. In the write period, data potential (−Vdata) is supplied to the capacitance Cs to adjust the gate potential of the driving transistor Td to a desired value. More specifically, the power source line 10 is set to zero potential, the merge line 12 is set to a low potential (VgL), the Tth control line 11 is set to a high potential (VgH), the scan line 13 is set to a high potential (VgH), and the image signal line 14 is set to the data potential (−Vdata).

Figure 6:
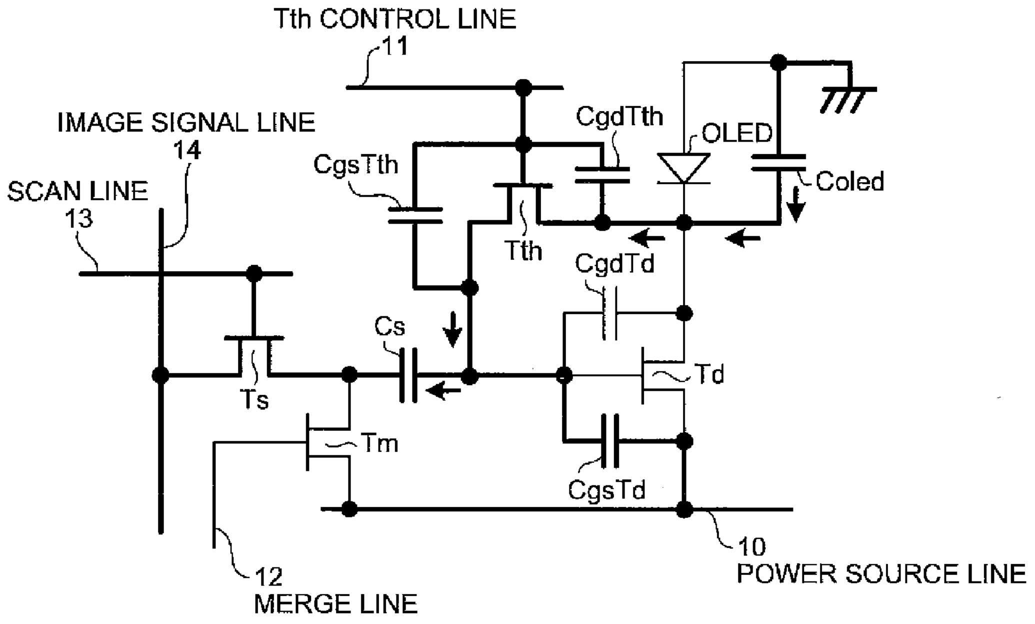
FIG. 6 is a diagram illustrating the operation during the write period in the sequence shown in FIG. 3.
Figure 7:
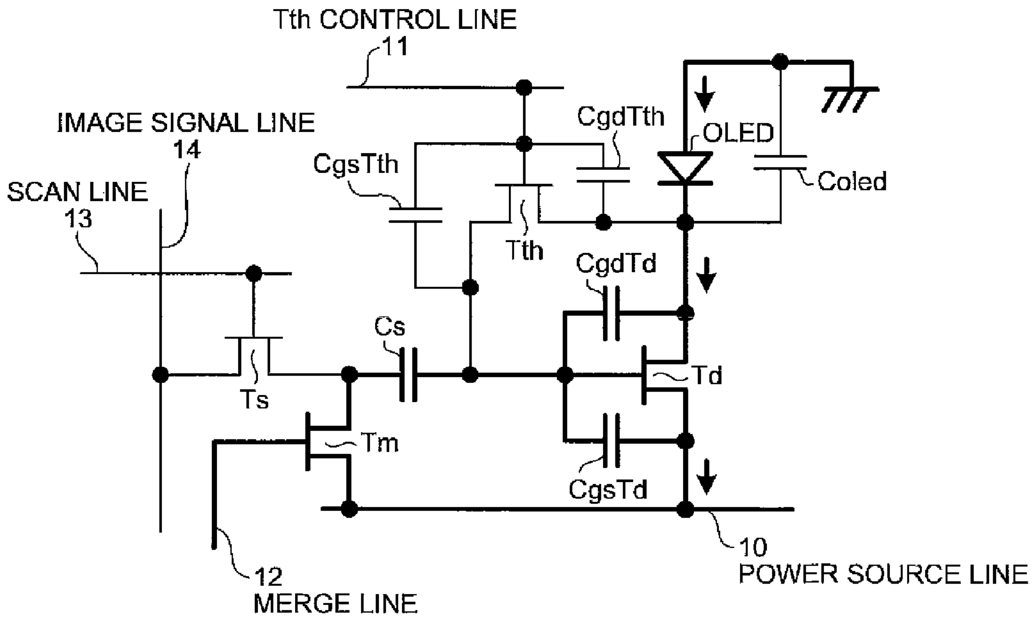
FIG. 7 is a diagram illustrating the operation during the light emission period in the sequence shown in FIG. 3.

With this, as shown in FIG. 6, the switching transistor Ts is turned on, and the switching transistor Tm is turned off. The device capacitance Coled previously charged is discharged, and thus current flows along the path from the device capacitance Coled through the threshold voltage detecting transistor Tth to the capacitance Cs. As a result, the capacitance Cs is charged. In other words, the charge stored in the device capacitance Coled is transferred to the capacitance Cs.

Gate potential Vg of the driving transistor Td is represented by the following equation where Vth is the threshold voltage of the driving transistor Td, Cs is the capacitance value of the capacitance Cs, and Call is the overall capacitance (i.e., the electrostatic capacitance and the parasitic capacitance connected to the gate of the driving transistor Td) when the threshold voltage detecting transistor Tth is ON (the same definition applies to other equations set forth below):

$$Vg = Vth - (Cs/\mathrm{Call}) \cdot V\mathrm{data} \quad (1)$$

Voltage VCs across the capacitance Cs is represented by the following equation:

$$\begin{aligned} VCs &= Vg - (-Vdata) \\ &= Vth + [(Call - Cs)/Call] \cdot Vdata \end{aligned} \quad (2)$$

The overall capacitance Call in Equation (2) is the overall capacitance when the threshold voltage detecting transistor Tth is in the conducting state, and is represented by the following equation:

$$\mathrm{Call} = Coled + Cs + CgsTth + CgdTth + CgsTd \quad (3)$$

The threshold voltage detecting transistor Tth connects between the gate and drain of the driving transistor Td, and thus the potentials of both ends of the driving transistor Td are substantially the same. For this reason, Equation (3) does not contain the capacitance CgdTd between the gate and drain of the driving transistor Td. Additionally, the capacitance Cs and the device capacitance Coled generally satisfy the relation Cs<Coled.

(Light Emission Period)

The operation during the light emission period is described next with reference to FIGS. 3 and 7. In the light emission period, the power source line 10 is set to a negative potential ($-V_{DD}$) the merge line 12 is set to a high potential (VgH), the Tth control line 11 is set to a low potential (VgL), the scan line 13 is set to a low potential (VgL), and the image signal line 14 is set to zero potential.

With this, as shown in FIG. 7, the driving transistor Td is turned on, the threshold voltage detecting transistor Tth is turned off, and the switching transistor Ts is turned off. Thus, current flows along the path from the organic light emitting device OLED through the driving transistor Td to the power source line 10. As a result, the organic light emitting device OLED emits light.

Current (Ids) that flows from the drain to source of the driving transistor Td is approximated as follows, according to the operational characteristics of the driving transistor Td determined by the magnitude relation among Vgs, Vth and Vds described later (in the case of an n-type transistor) as well as the structure of the driving transistor Td, constant β determined by the material, the voltage Vgs between the gate and source and the voltage Vds between the drain and source of the driving transistor Td, and the threshold voltage Vth:

(a) $Vgs - Vth < Vds$ (in the saturated region)

$$Ids = \beta \times [(Vgs - Vth)^2] \quad (4)$$

(b) $Vgs - Vth > Vds$ (in the linear region)

$$Ids = 2 \times \beta \times [(Vgs - Vth) \times Vds - (\tfrac{1}{2} \times Vds^2)] \quad (5)$$

In Equations (4) and (5), β is a characteristic coefficient of the driving transistor Td, and represented by the following equation where W (cm) is the channel width, L (cm) is the channel length, Cox ($F/cm^2$) is capacitance per unit area of the insulating film, and μ ($cm^2/Vs$) is the mobility of the driving transistor Td:

$$\beta = \tfrac{1}{2} \times \mu \times Cox \times W/L \quad (6)$$

Consideration is given below to the saturated region indicated by Equation (4). It should be noted that the following consideration is not intended to exclude the application of the present invention to the linear region.

The square root of Ids in Equation (4) is represented by the following equation:

$$(Ids)^{1/2}=(\beta)^{1/2}\times(Vgs-Vth) \quad (7)$$

To consider now the relation between the voltage Vgs and the current Ids while the voltage Vgs is a voltage between the gate and source of the driving transistor Td, the voltage Vgs is calculated below without taking the parasitic capacitance of the pixel circuit into account. during the light emission period, the driving transistor Td is conducting, and the voltage Vgs between the gate and source thereof is represented by the following equation:

$$Vgs=Vth+Coled/(Cs+Coled)-V\text{data} \quad (8)$$

Then, according to Equations (7) and (8), the voltage Vgs between the gate and source of the driving transistor Td and the square root of the current Ids satisfy the following relation:

$$\begin{aligned}(Ids)^{1/2} &= (\beta)^{1/2}\cdot(Coled/(Cs+Coled)\cdot Vdata) \quad (9)\\ &= a\cdot Vdata\end{aligned}$$

According to Equation (9), the square root of the current Ids, i.e., $(Ids)^{1/2}$, is independent of the threshold voltage Vth and is proportional to a write potential.

However, the present inventors have found that the square root of the current Ids obtained by actual measurement is larger than the value obtained by Equation (9) near the threshold voltage Vth.

Figure 8:
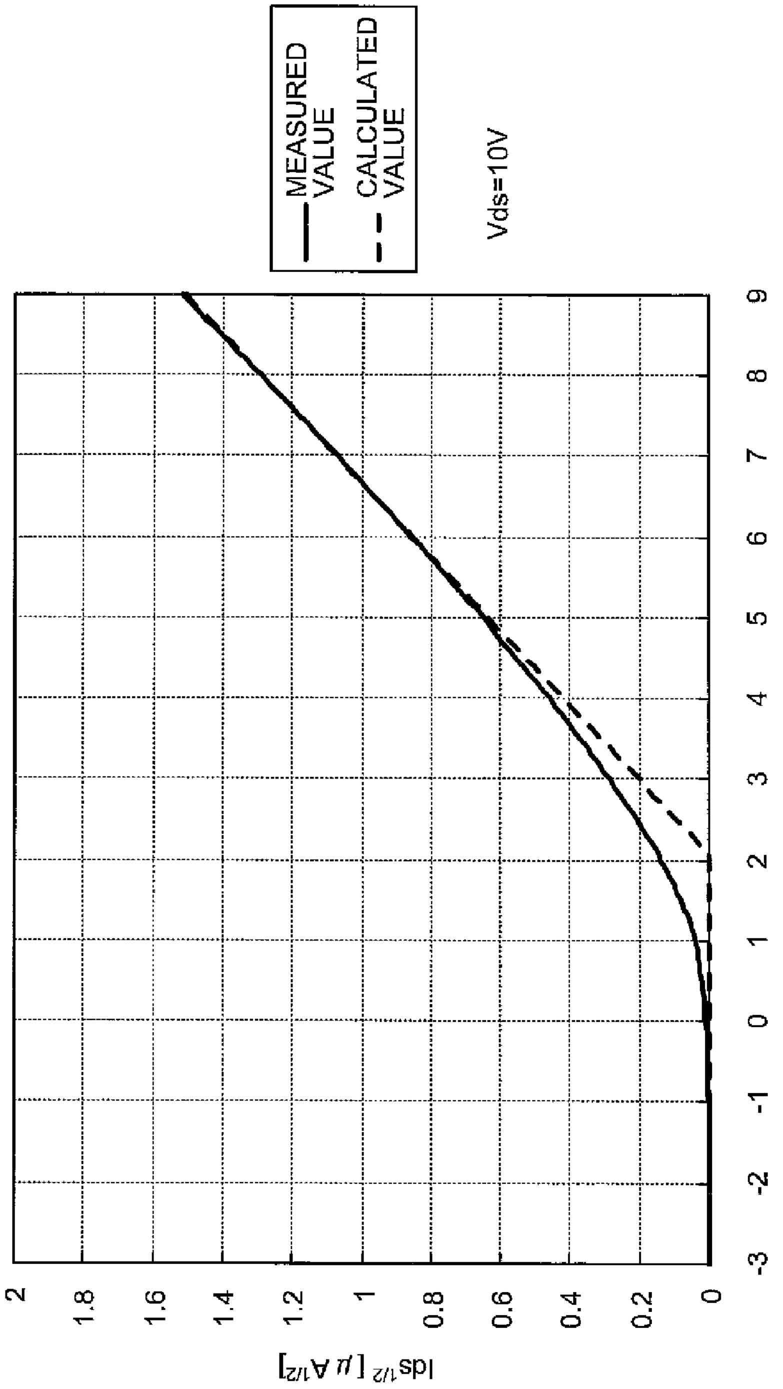
FIG. 8 is a graph showing the relation ($V\text{-}I^{1/2}$ characteristic) of current $(Ids)^{1/2}$ to voltage Vgs between the gate and source of a driving transistor Td.

FIG. 8 is a graph showing the relation (V-$I^{1/2}$ characteristic) of the current $(Ids)^{1/2}$ to the voltage Vgs between the gate and source of the driving transistor Td. In FIG. 8, the waveform indicated by the solid line shows an example of measured values, while that indicated by the dashed line shows an example of calculated values with characteristics according to Equation (9). Besides, the vertical line represents the current $(Ids)^{1/2}$, while the horizontal line represents the voltage Vgs.

Referring to FIG. 8, the greatest gradient of change in $(Ids)^{1/2}$ with respect to Vgs is present in the saturated region. The straight line of calculated values indicated by the dashed line represents the tangent to the V-$I^{1/2}$ characteristic curve at the point where the gradient is the greatest. The intersection of the straight line and the horizontal line ($(Ids)^{1/2}=0$) represents the threshold voltage Vth of the driving transistor Td. In the example of FIG. 8, the threshold voltage Vth is about 2 V.

Near the threshold voltage Vth (for example, within a range of ±2 V of the threshold voltage Vth), the calculated values significantly differ from the measured values. Due to this, even if light emission is controlled based on pixel values corrected using the threshold voltage Vth previously obtained, the current Ids is not sufficiently reduced near the threshold voltage Vth. This causes pixels with a value near the threshold voltage (low gray level) to be luminous, resulting in degradation of the contrast ratio of the image display apparatus.

Therefore, according to this embodiment, when the light emission of the organic light emitting device is controlled based on pixel values stored in the capacitance Cs as an image signal potential, a reverse bias voltage is applied to the organic light emitting device OLED by, for example, changing the potential of the power source line between the write period and the light emission period. The term "reverse bias voltage" as used herein refers to a voltage having a polarity opposite to that of a voltage applied to supply a current upon the light emission of the organic light emitting device OLED (i.e., forward current).

Described below is a control method of the embodiment including a step of changing the potential of the power source line between the write period and the light emission period. When the the potential of the power source line is changed, a certain amount of charge is stored in the device capacitance Coled. Therefore, this period is referred to as "charge period".

Figure 9:
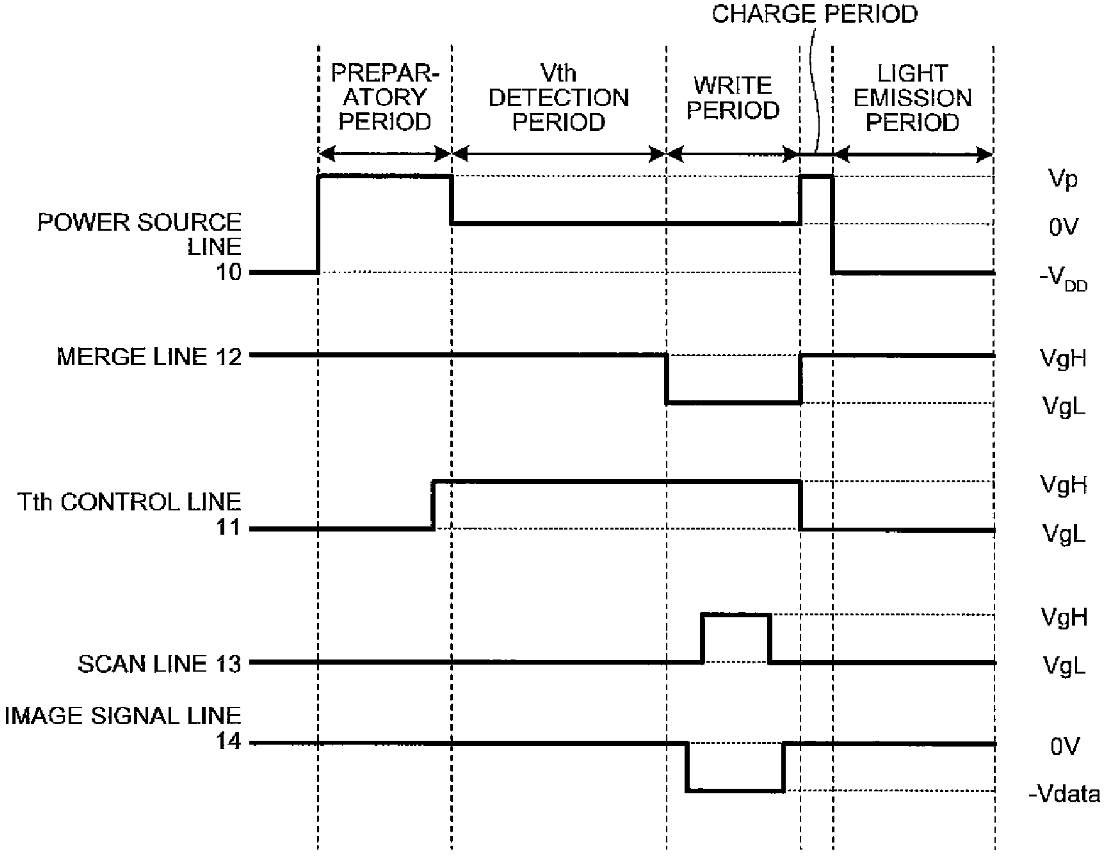
FIG. 9 is a sequence diagram showing the operation of the pixel circuit shown in FIG. 2 to which is applied a control method according to an exemplary embodiment of the present invention.

FIG. 9 is a sequence diagram showing the operation of the pixel circuit shown in FIG. 2 to which is applied a control method according to an exemplary embodiment of the present invention. The sequence shown in FIG. 9 differs from that of FIG. 3 in that the potential of the power source line 10 is raised from zero to Vp in the charge period provided between the write period and the light emission period. As the potential of the power source line 10 increases, the source potential of the driving transistor Td also increases. Consequently, the device capacitance Coled can be charged to a predetermined level as in the preparatory period. In the preparatory period, the device capacitance Coled is charged so that it acts as a source of current upon detection of the threshold voltage. On the other hand, in the charge period, the device capacitance Coled is charged to reduce the current that instantaneously flows at the initial stage of the light emission period.

Figure 10:
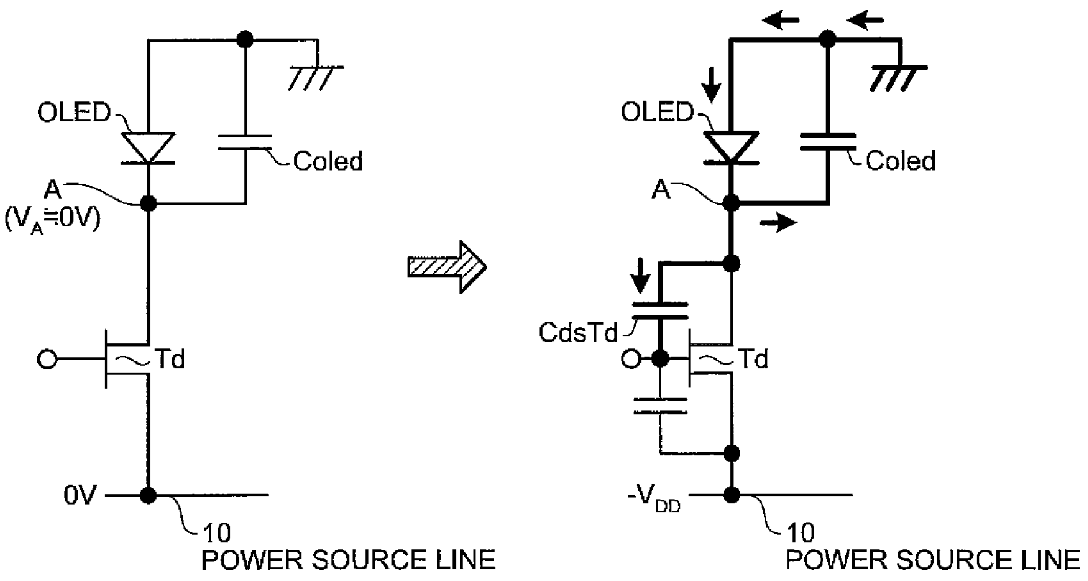
FIG. 10 is a diagram illustrating the operation when light emission is controlled based on the conventional sequence shown in FIG. 3.
Figure 11:
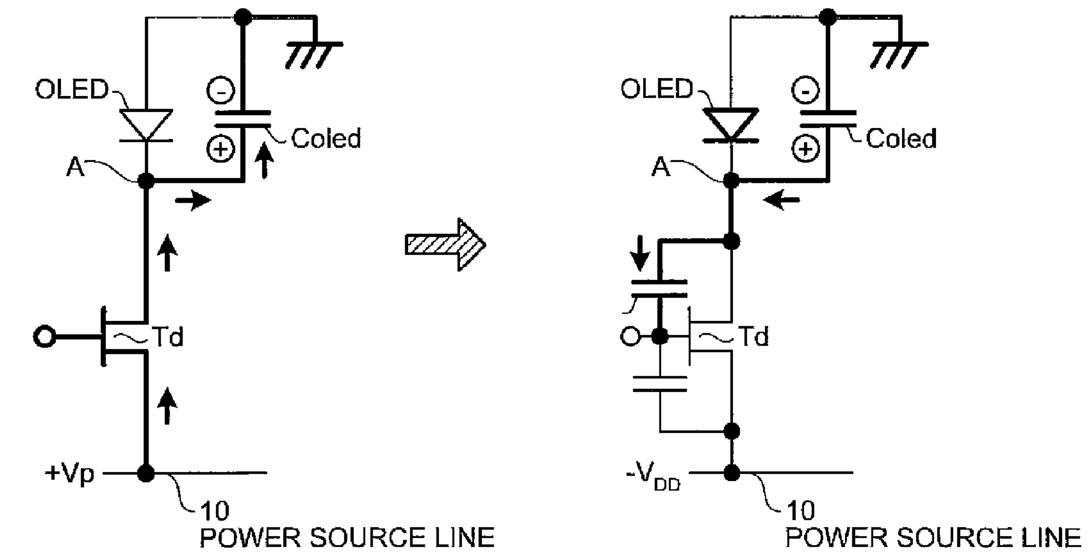
FIG. 11 is a diagram illustrating the operation when light emission is controlled based on the sequence of the present invention shown in FIG. 9.

FIG. 10 is a diagram illustrating the operation when light emission is controlled based on the conventional sequence shown in FIG. 3. FIG. 11 is a diagram illustrating the operation when light emission is controlled based on the sequence of the present invention shown in FIG. 9. FIGS. 10 and 11 only shows part of constituent elements: the organic light emitting device OLED, the device capacitance Coled and the the driving transistor Td, extracted from the pixel circuit shown in FIG. 2. Incidentally, drain-source capacitance CdsTd, more specifically, parasitic capacitance between the drain and source of the driving transistor Td is connected in parallel with the driving transistor Td.

The left side of FIG. 10 depicts the state immediately before the shift to the light emission period (where 0 V is applied to the power source line). The right side of FIG. 10 depicts the state immediately after the shift to the light emission period (where $-V_{DD}$ is applied to the power source line 10). Current flows through the organic light emitting device OLED until the device capacitance Coled and the parasitic capacitance of the driving transistor are charged. In the state shown on the left side of FIG. 10, cathode potential $V_A$ of the organic light emitting device OLED is substantially zero, and the organic light emitting device OLED is charged little. When the state shifts as shown on the right side of FIG. 10, current flows through the organic light emitting device OLED. That is, in the state shown on the right side of FIG. 10, current flows through the organic light emitting device OLED that is required to emit light at a low gray level. This is analyzed below by using some equations.

Immediately after $-V_{DD}$ is applied to the power source line 10, the voltage is dividedly applied to the device capacitance Coled and the drain-source capacitance CdsTd. Thus, the cathode potential $V_A$ of the organic light emitting device OLED is represented as follows:

$$V_A=k_1V_{DD}$$

where $k_1$ is a real number that satisfies $0<k_1<1$, and logically, $k_1$=Qtd/(Qoled+Qtd) where Qoled is charge stored in the organic light emitting device OLED, and Qtd is charge stored in the the driving transistor Td.

At this point, the device capacitance Coled is charged little. Therefore, Qoled takes a value close to zero, and thus the value of $k_1$ is large. As a result, the absolute value of $V_A$ becomes large. Accordingly, when the power source line 10 is set to $-V_{DD}$, potentials applied to both ends of the organic light emitting device OLED differ significantly from each other. This means that even if a voltage applied to the driving transistor Td is at the off level or around the off level (i.e., light emission luminance is at the black level or close to the black level), a large current flows through the organic light emitting device OLED.

On the other hand, the left side of FIG. 11 depicts the state immediately before the shift from the charge period to the light emission period in the control sequence of the present invention shown in FIG. 9. In the sequence of the present invention, +Vp is applied to the power source line 10 during the charge period provided between the write period and the light emission period. With this, a reverse bias voltage is applied to the device capacitance Coled, and thus, the organic light emitting device OLED stores a certain amount of charge. As a result, in the state immediately after the potential $-V_{DD}$ is applied to the power source line 10 during the light emission period, as shown on the right side of FIG. 11, the organic light emitting device OLED is discharged. While being discharged, the organic light emitting device OLED is not likely to allow current flow therethrough. After the organic light emitting device OLED is completely discharged, current easily flows through the organic light emitting device OLED. Accordingly, current flows through the organic light emitting device OLED according to a voltage applied to the driving transistor Td. Therefore, when a voltage applied to the driving transistor Td is at the off level or around the off level at the initial stage of the light emission period, light emission current can be prevented from flowing through the organic light emitting device OLED. This is described below using the equation given above.

When a reverse bias voltage is applied to the organic light emitting device OLED, the value of Qoled becomes large, while the value of $K_1$ becomes small. As a result, the absolute value of the cathode potential $V_A$ becomes small. Therefore, even immediately after the power source line 10 is set to $-V_{DD}$, the difference between potentials applied to both ends of the organic light emitting device OLED can be minimized. This enables to reduce the current passing through the organic light emitting device OLED. Incidentally, as the value of Qtd is smaller, a smaller $K_1$ can be obtained. With smaller $K_1$, it is possible to reduce the current that flows through the organic light emitting device OLED at the initial stage of the light emission period. For this reason, it is preferable that the relation Coled>CdsTd be satisfied.

Figure 12:
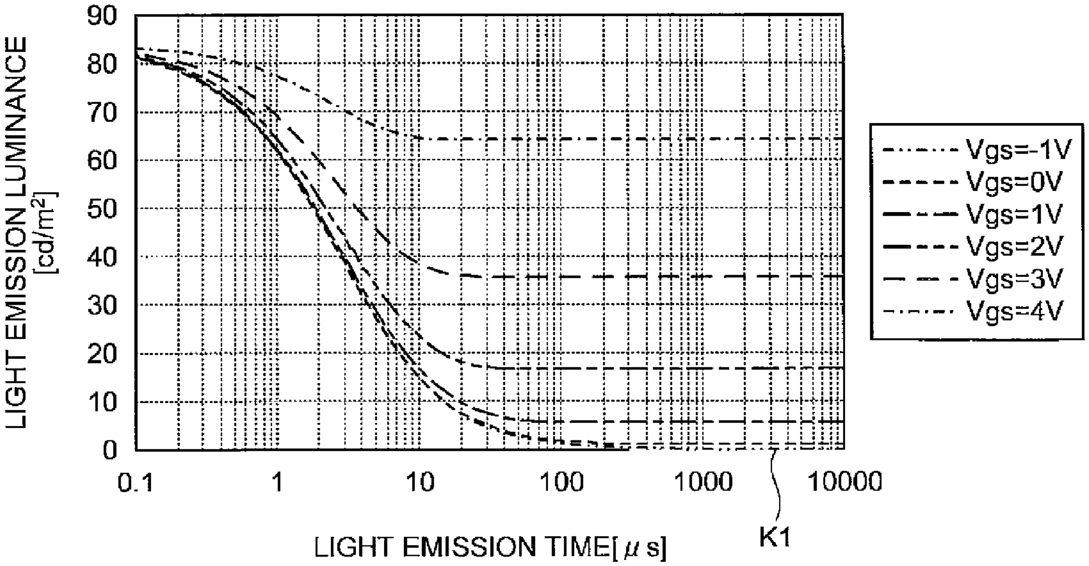
FIG. 12 is a graph showing the relation between the light emission time and the light emission luminance when light emission is controlled based on the conventional sequence shown in FIG. 3.

FIG. 12 is a graph showing the relation between the light emission time and the light emission luminance when light emission is controlled without applying a reverse bias voltage to the organic light emitting device OLED as in the conventional sequence shown in FIG. 3. As a specific example, it is assumed herein that Vds is 10 V (fixed), and Vgs ranges from −1 V (black level) to 4 V. The horizontal line of the graph represents a logarithmic plot of the light emission time, while the vertical line represents a linear plot of the light emission luminance.

Referring to FIG. 12, in the conventional sequence, as, for example, indicated by curve K1 (Vgs=−1 V), a period exists in which the light emission luminance increases instantaneously at the initial stage of the light emission period. As a result, at the initial stage of the light emission period in the conventional sequence, the light emission luminance of the organic light emitting device OLED that is required to emit light at a low gray level is not sufficiently lowered. This raises the luminance of the black level, and thus the contrast ratio falls below a set value.

Figure 13:
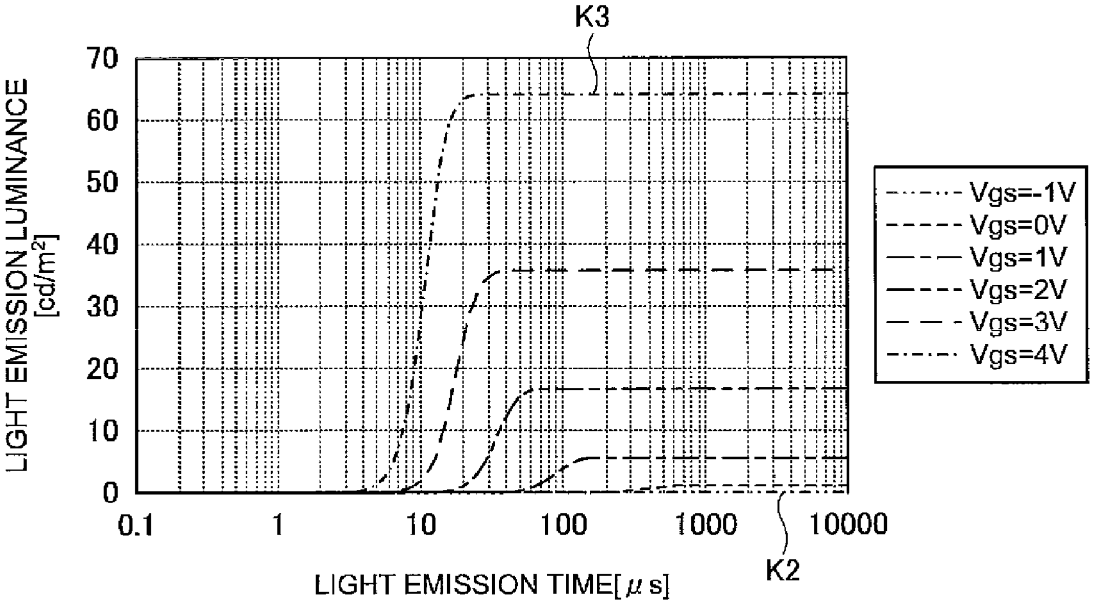
FIG. 13 is a graph showing the relation between the light emission time and the light emission luminance when light emission is controlled based on the control sequence of the present invention shown in FIG. 9.

FIG. 13 is a graph showing the relation between the light emission time and the light emission luminance when light emission is controlled with a period (the charge period) for applying a reverse bias voltage to the organic light emitting device OLED as in the sequence of the present invention shown in FIG. 9. The measurement parameters and the like are the same as in FIG. 12 except that a potential of about 6 V is applied to the power source line 10.

Referring to FIG. 13, in the sequence of the present invention, as, for example, indicated by curve K2 (Vgs=−1 V), the light emission luminance is minimized at the initial stage of the light emission period. As a result, at the initial stage of the light emission period, the light emission luminance of the organic light emitting device OLED that is required to emit light at a low gray level is sufficiently lowered. Thus, the contrast ratio can be prevented from decreased.

If this embodiment is applied to the case where, to suppress the light emission luminance of the organic light emitting device OLED at the initial stage of the light emission period, it is considered to be advantageous that the organic light emitting device OLED emits light with high luminance at a high gray level as, for example, indicated by curve K3 (Vgs=−4 V), from the initial stage of the light emission period, there is a concern that the luminance of the white level decreases compared to the conventional example. However, a period in which the light emission luminance decreases is set to 20 μsec. or less per frame, which is sufficiently shorter than the light emission period that usually lasts for 2 msec. or more. Consequently, the vision of images displayed on the image display apparatus is hardly affected. Thus, as in this embodiment, from the view point of improving the contrast ratio of the image display apparatus, it is preferable to suppress the luminance of pixels with a low gray level at the initial stage of the light emission period.

While, in this embodiment, the driving transistor Td is described as of N-type, it can be of P-type.

Besides, in this embodiment, in the control sequence shown in FIG. 9, the potential Vp, i.e., a potential applied during the preparatory period, is also applied during the charge period. However, the same potential as is applied during the preparatory period is not necessarily applied during the charge period. It is only required that the device capacitance Coled be charged such that a reverse bias voltage is applied to the organic light emitting device OLED during the charge period. Preferably, the charge period is determined from such viewpoints that a reverse bias voltage is to be reliably applied to the organic light emitting device OLED and that the light emission period is to be sufficiently secured. For example, it is only required that a time be secured which is no shorter than one half of a time constant determined by the device capacitance Coled and the the driving transistor Td and no longer than twice the time constant.

Moreover, according to the embodiment, a reverse bias voltage is applied to the organic light emitting device OLED after the writing of an image signal. Therefore, the application of a reverse bias voltage hardly affects the data write operation. Furthermore, since a reverse bias voltage is applied after all the pixels are written with an image signal, the reverse bias voltage is applied to all the pixels for substantially the same period of time.

Figure 14:
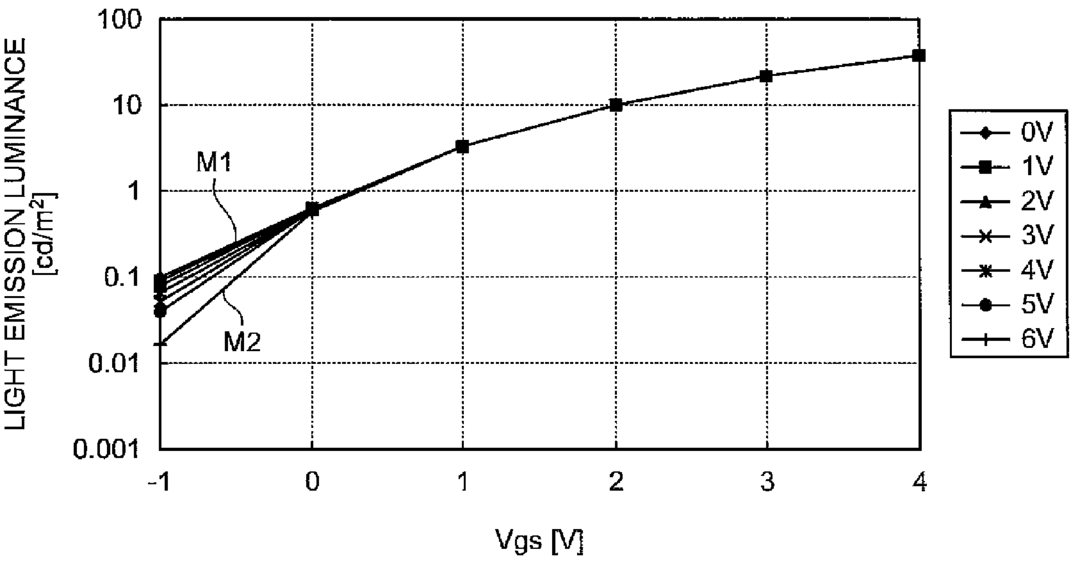
FIG. 14 is a graph showing the relation of light emission luminance of an organic light emitting device OLED and voltage Vgs between the gate and source of the driving transistor Td when light emission is controlled based on the control sequence of the present invention shown in FIG. 9.

FIG. 14 is a graph showing the relation of the light emission luminance of the organic light emitting device OLED and the voltage Vgs between the gate and source of the driving transistor Td when light emission is controlled based on the control sequence of the present invention shown in FIG. 9. The graph of FIG. 14 depicts the luminance of the red pixel when the length of the light emission period is 7.8 ms. It is also assumed in the graph that Vds is 10 V (fixed), Vgs ranges from −1 V (black level) to 4 V, and that the potential of the power source line 10 varies in the range of 0 to 6 V in the charge period. Incidentally, the horizontal line of the graph represents a linear plot of Vgs, while the vertical line represents a logarithmic plot of the light emission luminance.

Referring to FIG. 14, when the potential of the power source line 10 is 0 V (i.e., as in the conventional sequence: curve M1), a luminance of about 0.1 [cd/m2] is caused even in the case of low gray-level display (Vgs=−1 V). Meanwhile, when the potential of the power source line 10 is 6 V (curve M2), in the same black level display, the light emission luminance decreases to about 0.02 [cd/m2]. On the other hand, in the case of high gray-level display (Vgs=4 V), substantially constant luminance is achieved independent of the potential of the power source line 10. As described above, with the control sequence of the present invention, the luminance of low gray-level display can be lowered while that of high gray-level display is maintained. Thus, it is possible to improve the contrast ratio.

In the above description, the control sequence as shown in FIG. 9 is applied to the pixel circuit configured as shown in FIG. 2. However, the pixel circuit shown in FIG. 2 includes various elements not essential to the present invention.

For example, the pixel circuit shown in FIG. 2 is configured as having a function of detecting the threshold voltage. However, according to the present invention, it is only required that a period for applying a reverse bias voltage to the organic light emitting device OLED be provided between the write period in which a data potential, i.e., an image signal, is written and the light emission period. That is, it is not essential to the present invention whether a period exists in which the threshold voltage of the driving transistor Td serving as a driver means is detected. In a similar sense, the number of the control transistors except the driving transistor is not limited by the above embodiment. Further, the pixel circuit shown in FIG. 2 includes the organic light emitting device OLED as its light emitting means; however, LED or other electroluminescence devices can be used as the light emitting means.

Still Further, the pixel circuit shown in FIG. 2 is configured as a voltage-control type pixel circuit. However, the control sequence of the present invention can be applied a current-control type pixel circuit having different configuration than that shown in FIG. 2.

A brief description is given below, with reference to FIGS. 15 to 17, of the difference between a voltage-control type pixel circuit and a current-control type pixel circuit.

Figure 15:
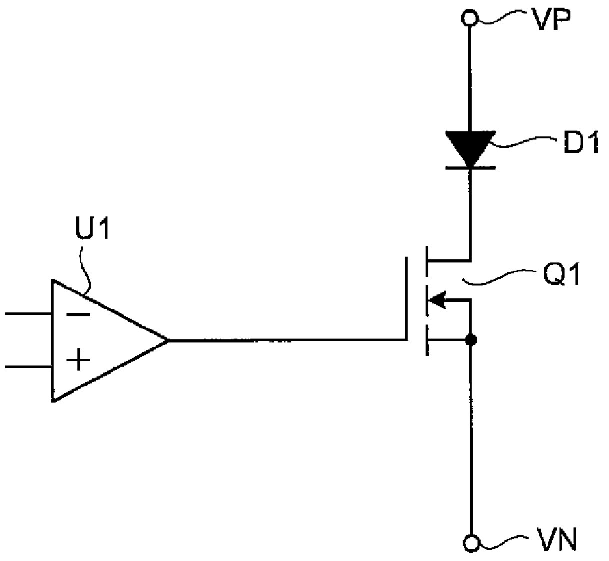
FIG. 15 is a diagram showing an example of a configuration of a voltage-control type pixel circuit.

A pixel circuit shown in FIG. 15 includes a light emitting device D1, a driving device Q1 that is connected in series with the light emitting device D1, and a controller U1 that controls the driving device Q1. This pixel circuit is equivalent to the one shown in FIG. 1. For example, the light emitting device D1 corresponds to the above organic light emitting device. The anode of the light emitting device D1 is connected to a VP terminal on the side of high applied voltage (corresponding to the ground potential). On the other hand, the cathode of the light emitting device D1 is connected to the drain of the driving device Q1 corresponding to the driving transistor Td. The source of the driving device Q1 is connected to a VN terminal on the side of low applied voltage (corresponding to the power source line 10), while its gate is connected to the output terminal of the controller U1. The controller U1 controls the gate voltage of the driving device Q1. The controller U1 includes a single or a plurality of TFTs (corresponding to the threshold voltage detecting transistor Tth, and the switching transistors Ts and Tm), and a capacitance device such as a capacitor (corresponding to the capacitance Cs). Incidentally, the connection configuration as shown in FIG. 15 is of "voltage-control type", in which the light emitting device D1 is connected to the drain of the driving device Q1 and then the gate of the driving device Q1 is controlled, and is specifically referred to as "gate control/drain drive".

Figure 16:
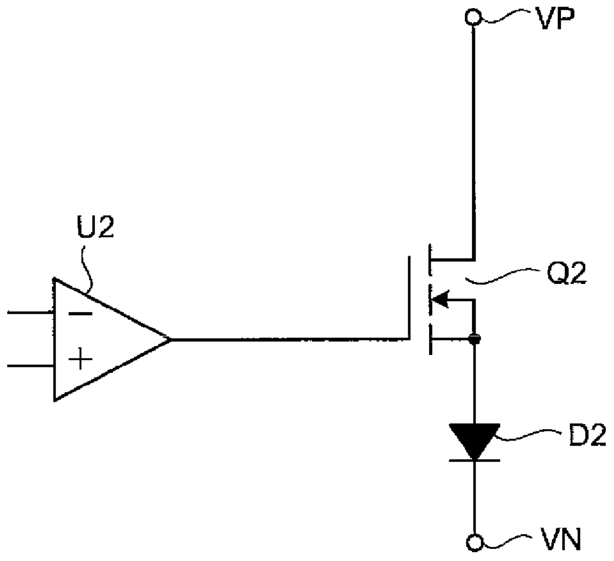
FIG. 16 is a diagram showing an example of a configuration of a voltage-control type pixel circuit different from the one shown in FIG. 15.

FIG. 16 is a diagram showing an example of a configuration of a voltage-control type pixel circuit different from the one shown in FIG. 15. The pixel circuit shown in FIG. 16 is of the same or equivalent configuration to the pixel circuit shown in FIG. 15 except that a light emitting device D2 is connected to the source of a driving device Q2. The pixel circuit shown in FIG. 16 is of "voltage-control type", in which the gate of the driving device Q2 is controlled as with the one shown in FIG. 15, and is specifically referred to as "gate control/source drive".

The pixel circuit shown in FIG. 16 is basically the same as the circuit of FIG. 15, and the control sequence described above can similarly be applied to the circuit of FIG. 16.

Figure 17:
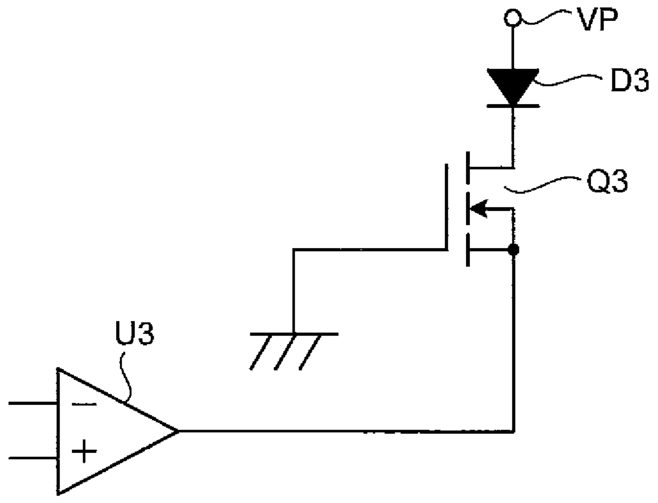
FIG. 17 is a diagram showing an example of a configuration of a current-control type pixel circuit different from the ones shown in FIGS. 15 and 16.

FIG. 17 is a diagram showing an example of a configuration of a current-control type pixel circuit different from the ones shown in FIGS. 15 and 16. The pixel circuit shown in FIG. 17 is similar to that shown in FIG. 15 in that a light emitting device D3 is connected to the drain of a driving device Q3, but is different in that the gate of the driving device Q3 is grounded and current on the source side of the driving device Q3 is controlled by a controller U3. Incidentally, the pixel circuit shown in FIG. 17 is configured such that the source side of the driving device Q3 is controlled, and among those of "current-control type", the configuration is specifically referred to as "source control/drain drive".

The pixel circuit shown in FIG. 17, as with those of FIGS. 15 and 16, has problems that the light emission luminance of the light emitting device D3 that is required to emit light at a low gray level is not sufficiently lowered when the potential of the VP terminal is changed in the light emission period. Thus, the contrast ratio is degraded. For this reason, the control sequence of the present invention can similarly be applied to the pixel circuit shown in FIG. 17.

INDUSTRIAL APPLICABILITY

As set forth hereinabove, a method of driving an image display apparatus according to the present invention contributes greatly to improving the contrast ratio of pixel circuits.

The invention claimed is:

1. A method of driving an image display apparatus that includes a plurality of pixel circuits each provided with a light emitting unit and a driving unit that is electrically connected to the light emitting unit and controls light emission of the light emitting unit, the method comprising:

feeding the pixel circuit with an image signal corresponding to light emission luminance of the light emitting unit;

charging a device capacitance of the light emitting unit by applying a reverse bias voltage to the light emitting unit after feeding the pixel circuit with the image signal; and causing the light emitting unit to emit light based on the image signal, wherein the reverse bias voltage is applied by changing a potential of a power source line that is electrically connected to the light emitting unit and the driving unit from a first potential to a second potential, wherein the device capacitance of the light emitting unit is discharged after the potential of the power source line is changed from the second potential to a third potential during a light emission period in which the light emitting unit emits light, and wherein the light emitting unit is not to allow current flow therethrough until the device capacitance of the light emitting unit is discharged.

2. The method of driving an image display apparatus according to claim 1, wherein the light emitting unit and the driving unit are electrically connected in series with each other upon applying the reverse bias voltage to the light emitting unit and causing the light emitting unit to emit light.

3. The method of driving an image display apparatus according to claim 1, wherein the light emitting unit includes an organic light emitting device, the driving unit includes a thin film transistor, and a capacitance of the organic light emitting device is larger than a parasitic capacitance between a source and a drain of the thin film transistor.

* * * * *